(12) United States Patent
Bauer et al.

(10) Patent No.: US 6,759,117 B2
(45) Date of Patent: Jul. 6, 2004

(54) MULTILAYER CERAMIC COMPOSITE AND PROCESS FOR FORMING THE COMPOSITE

(75) Inventors: Moritz Bauer, Augsburg (DE); Martin Christ, Wehringen (DE); Udo Gruber, Neusäss (DE); Michael Heine, Allmannshofen (DE); Andreas Kienzle, Thierhaupten (DE); Jens Rosenlöcher, Augsburg (DE); Rainer Zimmermann-Chopin, Ellgau (DE)

(73) Assignee: SGL Carbon AG, Meitingem (DE)

( * ) Notice: Subject to any disclaimer, the term of this patent is extended or adjusted under 35 U.S.C. 154(b) by 113 days.

(21) Appl. No.: 10/190,821

(22) Filed: Jul. 8, 2002

(65) Prior Publication Data

US 2003/0012938 A1 Jan. 16, 2003

(30) Foreign Application Priority Data

Jul. 11, 2001 (DE) .......................................... 101 33 635

(51) Int. Cl.[7] .............................................. B32B 18/00
(52) U.S. Cl. .................... 428/293.4; 428/699; 428/110; 428/698; 428/697; 428/368; 428/642; 428/625; 264/241; 264/44; 264/645; 264/625; 264/640; 264/642; 264/46.4; 156/60; 156/182; 156/285
(58) Field of Search .................. 264/658, 659, 264/1.7, 22, 460, 43, 44, 45.1, 45.3, 46.4, 48, 137, 293.4, 645, 625, 640, 642, 643; 501/35, 88, 90, 95.2; 428/293.4, 699, 704, 110, 336, 698, 697, 368, 389; 156/50, 182, 285

(56) References Cited

U.S. PATENT DOCUMENTS

| 5,102,698 | A | | 4/1992 | Cavalier et al. |
| 5,246,736 | A | | 9/1993 | Goujard et al. |
| 5,536,574 | A | | 7/1996 | Carter |
| 5,725,955 | A | | 3/1998 | Tawil et al. |
| 5,962,103 | A | * | 10/1999 | Luthra et al. ................ 428/107 |
| 6,030,913 | A | * | 2/2000 | Heine et al. .................. 501/88 |
| 6,261,981 | B1 | * | 7/2001 | Dietrich et al. ............ 501/95.2 |

FOREIGN PATENT DOCUMENTS

| DE | 197 10 105 A1 | 9/1998 |
| DE | 197 11 829 C1 | 9/1998 |
| DE | 198 56 721 A1 | 6/2000 |
| EP | 0 176 055 A1 | 4/1986 |
| EP | 0 375 537 A1 | 6/1990 |
| EP | 0 483 009 B1 | 4/1992 |
| EP | 0 619 801 B1 | 10/1994 |

* cited by examiner

Primary Examiner—Merrick Dixon
(74) Attorney, Agent, or Firm—Laurence A. Greenberg; Werner H. Stemer; Gregory L. Mayback

(57) ABSTRACT

A multilayer ceramic composite is described which contains at least one supporting zone having oxidation-sensitive reinforcing fibers as well as a matrix. The matrix optionally contains oxidation-sensitive components. The composite further contains at least one surface layer, as well as at least one additional protective layer disposed between the supporting zone and surface layer, and whose matrix is composed substantially of at least one component of the matrix of the supporting zone or cover layer. The protective layer further contains additives that form self-healing layers.

27 Claims, 1 Drawing Sheet

MULTILAYER CERAMIC COMPOSITE AND PROCESS FOR FORMING THE COMPOSITE

BACKGROUND OF THE INVENTION

Field of the Invention

The present invention relates to a multilayer ceramic composite containing at least one composite material forming a supporting zone that has oxidation-sensitive reinforcing fibers, and at least one ceramic surface layer.

Carbon-containing composite materials, are used for example for brake applications, and are known in particular from the aviation industry and motor racing sector. They offer the advantage of good tribological properties right up to very high loads and temperatures.

Materials formed of carbon fiber-reinforced carbon materials (CFC or C/C) are used widely in this connection. Such materials contain carbon fibers in the form of mats, woven fabrics or other types of two-dimensional fiber structures that are stacked on top of one another and to form three-dimensional bodies and are then post-compacted with carbon. The post-compaction may be carried out by repeated impregnation with so-called carbon precursor materials (substances that decompose under pyrolysis conditions to form carbon) such as pitches or resins, and their subsequent pyrolysis to form carbon, or by deposition of so-called pyrocarbon from the gaseous phase (CVI, chemical vapor infiltration).

Composite materials for tribological applications and in particular brake discs may be subdivided according to their structure into two zones having different requirement profiles and in most cases also different material properties and composition.

The outerlying zone exposed to wear and co-operating tribologically with a second body (e.g. the brake lining) is the friction surface, which is characterized by special friction and wear properties. The underlying material is the supporting zone (core body), whose task is essentially only to absorb the frictional forces and transmit them to the securement devices, as well as absorb and dissipate the frictional or braking energy.

Composite materials with a ceramics matrix have recently been developed on an increasing scale. In this connection, materials of particular interest are those that are built up from carbon fibers and a matrix of silicon carbide-containing (SiC) or Si/SiC-containing (additional silicon phases) matrices. These materials include in particular the so-called C/SiC materials, which are composed of carbon fibers or carbon-containing fibers and a matrix of carbon (C), Si and SiC. Such composite materials are known, inter alia, from Published, Non-Prosecuted German Patent Application DE 198 56 721, German Patent DE 197 11 829 C1 and Published, Non-Prosecuted German Patent Application DE 197 10 105 A1.

For the material properties—in particular the strength and rigidity—it is very important and normal practice to protect the reinforcing fibers by coating them with carbon or carbon-containing compounds.

A common feature of all the specified materials is that they contain carbon in fiber form or in the matrix, and that the materials are heated under use conditions to temperatures at which a noticeable oxidation of the carbon takes place during prolonged use. The oxidation is assisted by the fact that the listed materials, in general in the original state—i.e. without post-treatment and/or additional protective measures for fibers or matrix phases containing elementary carbon have a not insignificant open porosity. On account of oxidation and the loss of carbon caused thereby the structure is weakened and the strength is reduced. In the case of brake discs, the weakening may be very deleterious especially as regards the functioning of the supporting zone since a material failure in the region of the device for securing the brakes or discs can lead to a total failure of the assembly.

The effect of this oxidative damage can be monitored for example by the weight loss of the composite materials during use.

For this reason composite materials for tribological applications and in particular high-performance brake discs with core bodies or supporting zones of carbon-containing material must include effective anti-oxidation mechanisms for the supporting zone. Since the physical properties, in particular the coefficient of thermal expansion, and the chemical properties of different CFC or different C/SiC or Si/SiC materials (silicon carbide-containing materials infiltrated with silicon) may differ greatly, the effectiveness of every such anti-oxidation system also varies greatly.

Various solutions have been proposed to provide antioxidation protection.

The application of anti-oxidation surface layers is one of the most commonly employed methods. Specifically in the case of CFC and C/SiC composites it is of particular importance for the anti-oxidation protection that these materials are permeated by a fine crack structure that can expand and close under alternating thermal loads. In addition, new cracks are also generated under mechanical stress.

Accordingly it is particularly those anti-oxidation protective layers that are self-healing that are of great interest. The mechanism of self-healing is based on the property that the protective layers melt at the application temperature and newly-formed cracks can reseal.

Such systems are described for example in European Patent EP 0 619 801 B1 and Published, European Patent Application EP 0 375 537 A1. The disadvantage with these systems is the fact that the protective layer formed as a glass layer has to act as a carrier of the self-healing properties in order to protect the supporting zone specifically on the surface layer, i.e. the outermost surface. On account of the softening and/or melting of this layer at the application temperature, the frictional behavior is seriously impaired.

Another possibility for crack sealing under the application conditions is to add high melting point elements, binary or multinary compounds, for example boron compounds, that oxidize at elevated temperatures under the admission of air at least partially to form oxides such as $B_2O_3$ and/or low melting point glasses such as borate glasses. A double-ply cover layer system on a CFC body is described in U.S. Pat. No. 5,536,574. The CFC body is coated with a mixture of Si, SiC and $Al_2O_3$ and then borated with a boron-containing mixture. A second boron-containing layer is then applied. In this case too the outermost layer softens at the application temperature and accordingly the functioning of the tribologically active surface cannot be guaranteed.

Furthermore, the $B_2O_3$ glasses formed from the boron-containing compounds have turned out to be extremely harmful for the frictional properties of the cover layer.

As a further variant, the use of a boron-containing Si/SiC matrix has been proposed in U.S. Pat. No. 5,962,103. In this way cracks lying deep in the composite material can also be healed by the melting of the boron compounds formed during oxidation.

A disadvantage in use however is that the matrix properties, in particular the stiffness and strength, deteriorate markedly due to the formation of low melting point $B_2O_3$ glasses in the event of oxidation and under high temperature conditions.

Those reinforcing fibers and/or matrix materials that are oxidatively degraded at elevated temperature (i.e. at temperatures that may arise during use and that are above approximately 400° C.) are termed oxidation sensitive and may therefore lead to a weakening of the composite material. In particular carbon as a constituent of the matrix or in fiber form is oxidation sensitive, in which connection the oxidation sensitivity of the latter can be reduced in a known manner (in particular according to the teaching of Published, Non-Prosecuted German Patent Application DE 197 10 105, the relevant contents of which are incorporated by reference in the disclosure) by suitably coating the fibers.

SUMMARY OF THE INVENTION

It is accordingly an object of the invention to provide a multilayer ceramic composite and a process for forming the composite that overcome the above-mentioned disadvantages of the prior art compositions and methods of this general type.

With the foregoing and other objects in view there is provided, in accordance with the invention, a multilayer ceramic composite. The ceramic composite has at least one composite material forming a supporting zone and contains oxidation-sensitive reinforcing fibers. The composite material includes a matrix containing a mass proportion of at least 25% SiC, further phases being phases having Si or phases having Si alloys, and/or carbon being either carbon in elemental form or a carbon compound. At least one ceramic surface layer having reinforcing fibers is provided. The ceramic surface layer includes a matrix containing a mass proportion of at least 25% SiC, further phases being either phases having Si or phases having Si alloys, and/or carbon being either carbon in elemental form or a carbon compound. At least one protective layer having a matrix composed substantially of at least one component of the matrix of the supporting zone or the ceramic surface layer, is provided. The protective layer is disposed between the supporting zone and the ceramic surface layer. The protective layer contains additives whose oxides are low melting point glasses having a melting point of at most 1250° C.

The object of the present invention is accordingly to protect the supporting zone or core body of a composite ceramic reinforced with oxidation-sensitive fibers that may also contain oxidation-sensitive fractions in the matrix, in particular of carbon fiber-reinforced SiC, C/SiC or Si—SiC, against oxidative damage, in particular due to entry of air, by a self-healing and crack-sealing materials without having to alter the composition and properties of the surface layer of a composite ceramic joined thereto, which is provided in particular for frictional wear and which moreover is exposed to an entry of air.

The present invention achieves the object by the provision of the multilayer composite ceramic body that includes between the supporting zone and the surface layer a protective layer that is generically related to the composite material and contains the additives for the formation of self-healing layers. As additives there may be used in particular in this connection various boron-containing compounds and their oxidation products, or alkali metal aluminosilicates.

The term 'generically related' is understood in this context to mean that the matrix of the relevant layer is built up substantially from at least one of the matrix phases of the supporting zone or of the surface layer. The matrix composition of the relevant layer may, in this connection, still contain elements from the elements contained in the additives.

Thus for example in the preferred case of a supporting zone built up from fiber-reinforced C/SiC the matrix of the relevant generically related layer may be built up substantially from Si and/or SiC. In the case where the composite body is built up from a supporting zone of a CFC material and a surface layer of Si—SiC, the relevant layer would then be generically related if its matrix were built up predominantly from C, or Si and/or SiC.

The present invention accordingly provides a multilayer ceramic composite containing at least one supporting zone or supporting layer that includes oxidation sensitive reinforcing fibers as well as a matrix, with it also being possible for the matrix to contain oxidation-sensitive fractions, and at least one surface layer, characterized in that the surface layer contains at least one additional generically related protective layer situated between the supporting zone and surface layer and that contains additives that form self-healing layers.

Preferably the layers of the multilayer composite have the external shape of circular discs or flat cylinders. Such a rotationally symmetrical shape is necessary for the preferred use as friction discs (brake discs or coupling discs).

In accordance with an added feature of the invention, the compositions of the composite material of the ceramic surface layer and of the supporting zone are different.

In accordance with another feature of the invention, the reinforcing fibers are formed of carbon fibers, graphite fibers and/or carbon-containing fibers.

In accordance with an additional feature of the invention, the additives of the protective layer are high melting point elements, binary compounds or multinary compounds that have a melting point of at least 1450° C.

In accordance with a further feature of the invention, the additives are boron, non-oxidic boron compounds, boron carbide, calcium boride, boron silicide, aluminium boride, titanium boride, zirconium boride, alkali metals, alkaline earth metals, aluminum compounds, or oxides of the aluminum compounds.

In accordance with a further added feature of the invention, the protection layer has reinforcing fibers, and a volume proportion of the reinforcing fibers in the protective layer is below 80%.

In accordance with a further additional feature of the invention, the protective layer has a thickness of 0.02 to 5 mm.

In accordance with another further feature of the invention, the support zone has a given thickness, and the ceramic surface layer has a thickness that is less than 50% of the given thickness of the supporting zone.

In accordance with another added feature of the invention, the multilayer ceramic composite has a shape of a cylindrical disc with a given thickness. The ceramic surface layer has a thickness less than 20% of the given thickness of the cylindrical disc, and the thickness of the ceramic surface layer is at least 0.2 mm.

In accordance with another additional feature of the invention, a further protective layer is disposed on the supporting zone, and a further surface layer is disposed on the further protective layer.

With the foregoing and other objects in view there is provided, in accordance with the invention, a process for producing multilayer ceramic composites. The process includes providing a carbon-containing fiber-reinforced precursor for forming a supporting zone, providing at least one carbon-containing precursor for forming a surface layer, and bonding the carbon-containing fiber-reinforced precursor forming the supporting zone to the carbon-containing precursor forming the surface layer surface wide using an adhesive composition resulting in a bonded body. The adhesive composition during pyrolysis, produces a porous, carbon-containing layer and the adhesive composition contains glass-forming additives such as admixtures of high melting point elements, binary compounds, or multinary compounds in each case having melting points of at least 1450° C., and due to oxidation the glass-forming additives produce low melting point glasses with a melting point of at most 1250° C. The bonded body is pyrolyzed for forming a carbon-containing multilayer composite infiltrated with silicon or silicon alloys, and at least part of the carbon reacting with the silicon to form silicon carbide.

In accordance with an added mode of the invention, there is the step of setting a mean particle size of the glass-forming additives to be less than 120 μm.

In accordance with another mode of the invention, there is the step of bringing a silicon-containing melt into contact with the bonded body exclusively over a surface layer.

In accordance with a further mode of the invention, after an infiltration and reaction with the silicon, the bonded body is heated air or an oxygen-containing gas mixture for a sufficient time at an appropriate temperature, whereupon the glass-forming additive is at least partially converted into a low melting point oxidic glass. The heating is carried out at an appropriate temperature until a mass fraction of oxide phases in the adhesive composition transformed into a protective layer is 1 to 80%.

With the foregoing and other objects in view there is provided, in accordance with the invention, a process for producing multilayer ceramic composites. The process includes filling a compression mold with at least three molding compositions of different compositions that constitute precursors of a supporting zone, a protective layer and a surface layer. The molding compositions for the supporting zone and the surface layer contain carbon fibers and the molding composition leading to a formation of the protective layer contains a glass-forming additive being admixtures of high melting point elements, binary compounds, or multinary compounds each with melting points of at least 1450° C. and, due to oxidation, the glass-forming additive produces low melting point glasses with a melting point of at most 1250° C. The three molding compositions are compressed in the compression mold resulting in a compressed body. The compressed body is pyrolyzed which results in a carbon-containing multilayer composite infiltrated with silicon or silicon alloys, and at least part of the carbon reacts with the silicon to form silicon carbide.

Other features which are considered as characteristic for the invention are set forth in the appended claims.

Although the invention is illustrated and described herein as embodied in a multilayer ceramic composite, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
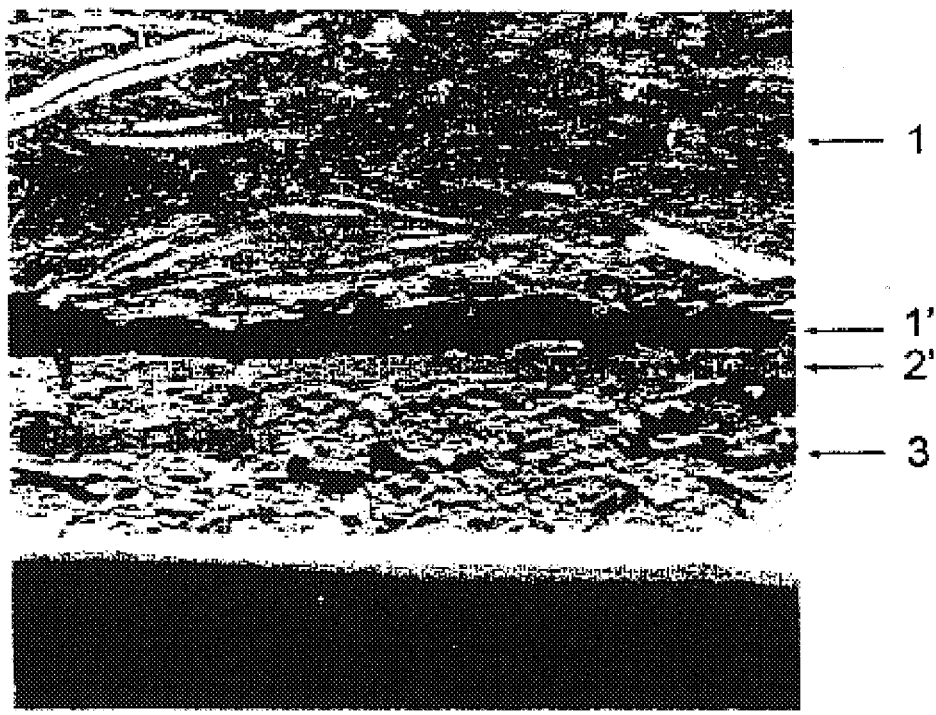
FIG. 1 is a photograph of a sectional view through a ceramic composite in which a layer is disposed between a supporting zone and a surface layer that contains no glass-forming additive according to the invention.

Referring now to the figures of the drawing in detail and first, particularly, to FIG. 1 thereof, there is shown a reference C/SiC plate containing a supporting zone 1, a barrier layer 2' without a glass-forming additive and a surface layer 3, after 15 hours of exposure to a stream of air at 800° C. Oxidative damage can be recognized by pore formations in the composite materials. It can clearly be seen that a pore-infiltrated zone has been formed between the supporting zone 1 and the barrier layer 2' (oxidized supporting zone 1').

Figure 2:
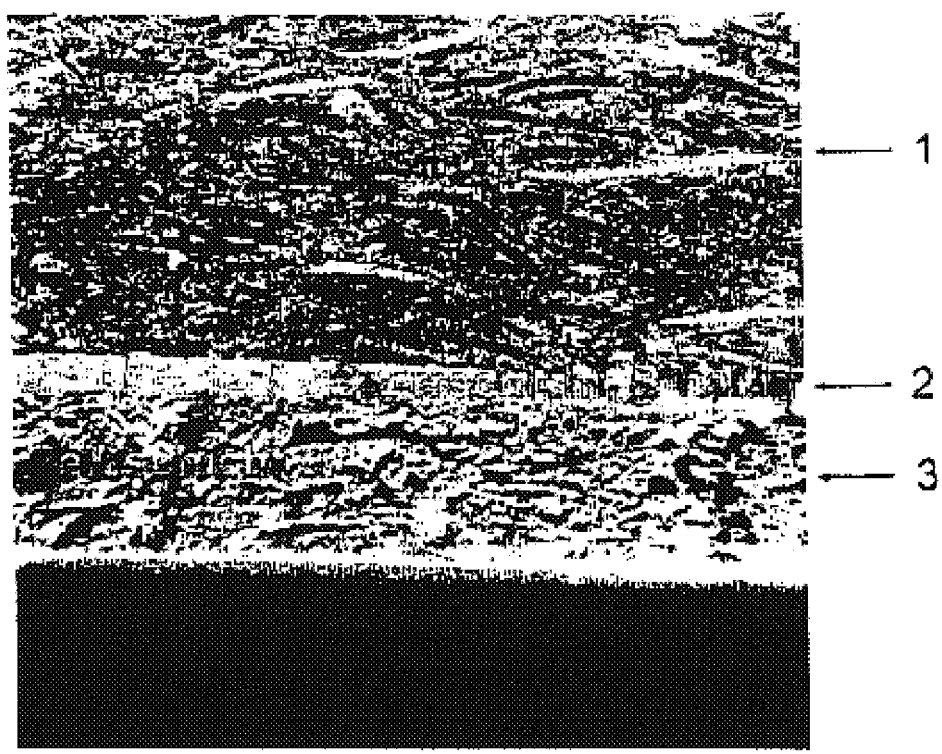
FIG. 2 is a photograph of a sectional view through the ceramic composite in which the layer disposed between the supporting zone and the surface layer that contains an additive, in this case a boron-containing additive, according to the invention.

FIG. 2 is a microphotograph of a C/SiC plate according to the present invention, which again contains the supporting zone 1, the barrier layer 2 and the surface layer 3. In this case, however, the barrier layer 2 contains, as glass-forming additive, a boron compound (titanium diboride, $TiB_2$). This corresponds to the embodiment of Example 3. As in the case of the composite illustrated in FIG. 1, here too the section and the photograph of the composite were made after 15 hour of exposure to a stream of air at 800° C. Pore formation due to oxidative damage can still be recognized but only in the surface layer or cover layer 3.

The invention furthermore relates to a process for the protection of the supporting zone of a multilayer fiber-reinforced ceramic composite material, for example a C/SiC brake disc, against oxidative attack by atmospheric oxygen on the oxidation-sensitive reinforcing fibers, in which the cracks in the matrix in the supporting zone are sealed with self-healing layers without the frictional properties of a friction layer lying thereon being adversely affected.

A variant is the process for the production of multilayer ceramic composites in which a precursor body containing carbon forming the supporting zone, and at least one precursor body containing carbon forming the surface layer, are bonded over their surfaces with an adhesive composition that, during pyrolysis, produces a porous, carbon-containing layer, wherein the adhesive composition contains, as glass-forming additives, admixtures of high melting point elements, binary or multinary compounds with melting points of at least 1650° C. which, due to oxidation, form low melting point glasses with a melting point of at most 1250° C., following which the bonded body is pyrolyzed and the carbon-containing multilayer composite formed thereby is stabilized by infiltration with silicon or silicon combinations and a reaction of at least part of the carbon with the silicon to form silicon carbide. The term silicon combinations is understood to mean, in particular, alloys or Si melts with metals from the group Fe, Cr, Mo, Ti and Al.

A further variant is a process for the production of multilayer ceramic composites in which a compression mold is filled with at least three mixtures of different compositions. A filling height for the respective mixtures being substantially constant over the surface of the compression mold, and the mixtures are the precursors of the supporting zone, protective layer and surface layer. The mixture leading to the formation of a protective layer contains, as glass-forming additives, admixtures of high melting point elements, binary or multinary compounds with melting points of at least 1650° C. which, due to oxidation, produce low melting point glasses with a melting point of at most 1250° C. The compressed body is then pyrolyzed and the carbon-containing multilayer composite that is thereby formed is stabilized by infiltration with silicon and reaction of at least part of the carbon with the silicon to form silicon carbide.

The glass-forming additives in the protective layer are preferably selected from high melting point elements, binary or multinary compounds with melting points above 1450° C., preferably above the process temperature for the formation of the SiC-containing matrix and particularly preferably above 1650° C., that, due to oxidation, produce low melting point glasses with a melting point of at most 1250° C., preferably at most 1000° C., and particularly preferably in the range from 500° to 9000° C. In particular the additives are selected from boron and non-oxidic boron compounds.

The mechanism of the oxidation protection of the supporting zone involves, in the case of boron-containing protective layers, the oxidation of the boron-containing compounds to form self-healing boron oxide-containing glasses that seal the cracks underneath the surface layer.

To summarize, the preferred production of multilayer ceramic composites with anti-oxidation protective layers according to the invention may be described as a sequence of the following steps:

a) the production of a carbon-containing precursor for the surface layer(s), protective layer(s) and supporting zone, in which the protective layer or barrier layer contains in particular, boron-containing compounds;

b) a formation of a composite with the SiC-containing matrix that firmly joins together all three different zones or layers; and c) the conversion of the protective layer into, in particular, a boron-containing ceramic or composite ceramic.

The second and third steps may take place jointly (at the appropriate temperature for the formation of the SiC-containing phase in the matrix).

The formation of the SiC-containing matrix may be achieved in this connection by gaseous phase infiltration (chemical vapor infiltration), liquid siliconization (LSI) or by the precursor pyrolysis of SiC precursor polymers. Infiltration of the precursor with liquid silicon, silicon alloys or silicon compounds is preferred.

Preferably the matrix of the composite material of the supporting zone and surface layer contains a mass proportion of at least 25% SiC and further phases containing Si or an Si alloy, and/or carbon in elementary form or as a compound. The compositions of the composite material of the supporting zone and surface layer are generally different.

According to the invention, it is also possible, however, to restrict the formation of the SiC-containing matrix to the outer zone of the composite material. This is achieved in particular if the carbon-containing precursor of the supporting zone is infiltrated only partially or superficially. In this way the composite material retains, in particular, a CFC core.

Although SiC-containing matrices are preferred according to the invention, the presence of SiC in the matrix is not absolutely essential. This is the case for example if a nitridic, in particular $Si_3N_4$ matrix, is built up by CVI processes by Si-containing reactive fillers in the carbon-containing precursors.

The ratio of the thicknesses of the supporting zone and surface layer depends on the specific application: normally the thickness of the surface layer is less than 50% of the thickness of the supporting zone.

A further aspect of the present invention is the use of a ceramic composite reinforced with carbon-containing fibers with a supporting zone and at least one surface layer formed as a friction zone, which are joined to one another, in each case via a protective or barrier layer containing, in particular boron compounds, as a brake disc, coupling disc or brake lining, or for other structural parts involving a tribological use.

In these applications the surface layer is formed as a friction zone or friction layer whose thickness is normally less than 20% of the thickness of the disc, but is at least 0.2 mm.

For use as a brake disk the composite contains a supporting zone and at least one surface layer, the supporting zone and surface layer being joined in each case over their surfaces by a protective layer.

It has surprisingly been found from investigations forming the basis of the present invention that, for the service life of the overall structural part, in particular for brake discs, it is less decisive that the friction zone is additionally protected against oxidative attack, but rather that the supporting zone is protected.

It is therefore an object of the present invention to provide only the supporting zone with an effective oxidation protection and not to provide the friction zone with an oxidation protection, for the sake of retaining the material composition optimized for the frictional properties.

A further aspect of the invention is even to protect the friction zone less than the supporting zone against oxidation, since in this way oxidative wear occurring in the structural part will be manifested first of all in the (outer lying) friction zone, which for example can easily be optically recognized. In this way it is possible to replace the structural part before the oxidative wear of the supporting zone can lead to the failure of the material.

The structure and the composition of the surface layer and supporting zone may be very similar and, depending on the requirement profile, may even be identical. The structure and the composition of the protective or barrier layer may differ from the latter substantially due to the additives, in particular boron-containing additives, and the content of reinforcing fibers.

Fibers or fiber bundles that may be disposed isotropically or anisotropically and with or without texturing, and optionally further fillers, are bound together by pitches and resins for the production of the carbon-containing precursors from which the supporting layer and surface layer are built up. Production methods known in CFC technology may be used for the production of the precursors.

Particularly preferred are CFC compositions containing coated short fiber bundles that are present aligned quasi-isotropically in a porous carbon matrix. Basically all high temperature resistant oxidic and non-oxidic reinforcing fibers may be used in the fibers that are employed. Composite materials containing oxidic fibers then need, in particular, to be protected against oxidation if the fibers are coated with carbon. Preferred are non-oxidic ceramic fibers based on carbon, silicon, boron and/or nitrogen and their compounds; carbon or graphite fibers are particularly preferred.

The carbon-containing precursor from which the barrier layer is formed, moreover, in a preferred manner also contains boron or boron compounds as additives. Other additives that lead to low melting point glasses that exhibit the desired anti-oxidation effect under use conditions include for example alkali metal and/or alkaline earth metal and aluminum compounds that form alkali metal aluminosilicates under the use conditions, in particular mixtures from the group containing Li, Na, K, Mg, Ca and Al oxides.

The carbon-containing precursors and/or parts of the precursors, preferably CFC, corresponding to the friction zone, the barrier layer and the supporting zone may be prepared and joined together individually or in a joint step. Preferably compressible compositions consisting of fiber material, supplementary substances and optionally additives, in particular boron-containing additives, are produced with hardenable carbon-containing binders and converted in a compression mold into a geometry similar to the final shape. In a particularly preferred modification according to the invention, the variously composed molding compositions corresponding to the precursors are added jointly in the sequence subsequently desired in the structural part, and then compressed and hardened.

It is however also possible to produce the precursors corresponding to the supporting zone or friction zone separately and to join them to the precursor corresponding to the barrier layer. The three precursors are then inseparably joined to one another by building up a common matrix, preferably a SiC-containing matrix.

In a further advantageous modification of the invention, the precursors corresponding to the supporting zone or friction zone are produced separately and joined by a mixture having an adhesive action, the adhesive zone being converted into the protective layer or barrier layer during the further course of the fabrication.

According to the invention the mixture having the adhesive action is composed of carbon-containing solids, pitch, resin, protective layer-forming compounds, in particular boron-containing compounds, and solvents. The composition of the mixture is essential for the effectiveness of the oxidation protection and the strength of the joint between the friction zone and supporting zone.

In the case where boron-containing additives are used their content is chosen so that, after the formation of the SiC-containing matrix, the barrier layer has a content of at least 5% boron referred to the number of atoms contained in the material of the protective layer. Preferably the boron content in the ceramicized and/or silicized barrier layer is 6 to 80% and particularly preferably 7 to 50%.

As additives there may preferably be used elemental boron and boron compounds from the group containing metal borides and Si/C/B/N or C/B/N compounds, in particular boron, boron carbide, calcium boride, boron silicide, aluminum boride, titanium boride and zirconium boride. Particularly preferred are boron carbide ($B_4C$), $TiB_2$ and $ZrB_2$ and their mixtures. It is however also possible to use alkali and/or alkaline earth and aluminum compounds, in particular mixtures from the group containing Li, Na, K, Mg, Ca and Al oxides.

The boron-containing compounds are normally added in powdered form to the mixture for the barrier layer. The mean particle size of the powders is preferably less than 120 $\mu$m and particularly preferably less than 75 $\mu$m.

Si/C/B/N or C/B/N compounds may be added as liquid polymer or, in ceramicized form, as powder.

The content of carbon-containing solids, pitch and resin in the mixture for the barrier layer is chosen so that during the following thermal process steps as few stresses as possible are generated in the finished structural part. Carbon-containing solids are understood in particular to denote graphite, carbon, pyrolyzed pitches and carbon-containing fibers and/or fiber bundles. Depending on the composition of the cover layer mixture it may also be advantageous to omit fibers completely in the barrier layer mixture.

Normally the volumetric proportion of fibers within the barrier layer after the formation of the SiC-containing matrix is below 80%, preferably below 40% and particularly preferably below 20%. In a further development of the invention the fiber content after the formation of the SiC-containing matrix is below 5%, in particular almost 0%.

The amount of compressible or adhesive mixture for the barrier layer is chosen so that the thickness of the layer is greater than 20 $\mu$m, and is preferably above 100 $\mu$m. Normally the layer thickness after the formation of the SiC-containing matrix is 0.02 to 5 mm, preferably 0.05 to 3 mm and particularly preferably 0.1 to 1 mm.

A liquid siliconization is preferably carried out for the construction of the SiC-containing matrix. For this, the carbon-containing precursor, which may be fabricated from one part by a joint compression procedure, as well as by joining a plurality of parts bonded with adhesive mixtures, is brought into contact with silicon, or a mixture of silicon or a silicon alloy and/or further metals. The silicon, which may consist of loose powder or may be present as molded articles bonded with various additives, is applied to the surfaces of the precursor. The silicon may furthermore also be added via wicks. The melt infiltration is initiated by heating the configuration in a furnace under a protective gas or in a vacuum above the melting point of silicon.

The mixtures of Si and further metals are infiltrated in this way as a liquid silicon alloy. The driving factor of the infiltration from the surface to the center of the structural part are the capillary attraction of the carbon-containing precursor and the reaction of silicon with carbon to form SiC.

Preferably a configuration of powder, (Si) molded articles or wicks is chosen so that the melt flows exclusively over the surfaces corresponding to the friction zone and/or surface layer. This is the preferred variant since in this way a discharge of the additives, preferably boron-containing additives, forming the protective layer from the barrier layer to the friction zone can be avoided.

During and after the melt infiltration, the reaction of the carbon with silicon to form silicon carbide and also the conversion of the materials forming the barrier layer into a ceramic or composite ceramic material take place in a furnace under a protective gas or under reduced pressure at temperatures of 1500° to 1800° C. In this way, generically related matrices, in particular of Si, SiC and C, penetrating all zones of the composite body, are built up. The matrix of each material zone consists substantially of at least one component of the matrix of one of the adjacent material zones.

Depending on the reactivity and nature of the compounds, in particular boron-containing compounds, forming the protective layer, the nature of the silicon melt, the temperature and reaction time, various binary or multinary compounds, in particular borides and silicides, are formed anew in the barrier layer. In this way the reactivity and/or effective thickness of the barrier layer can be specifically influenced.

In an advantageous modification of the invention the structural part is subjected to an oxidative annealing in air before the first use. The temperature and time are chosen so that the compounds, in particular boron-containing compounds, forming the protective layer are in some cases already converted to self-healing, in particular borate-containing, glasses. Preferred in this connection is the formation of borosilicate glasses, particularly preferably with Ti, Al or Zr oxide phases, within the barrier layer and underneath the friction zone. In general the barrier layer contains mass proportions of 1 to 90% of oxide phases, preferably at least 2 to at most 85%, and particularly preferably at least 2.5 to 80%.

If alkali metal, alkaline earth and aluminum oxides are used as additives of the protective layer, then the barrier layer normally contains more than 30% by wt. of oxide phases.

The ceramic composites according to the invention can be used as brake discs and coupling discs for vehicles such as cars and motorcycles, for tracked vehicles and for aircraft. The use of such composites is particularly advantageous if large forces have to be transmitted or large energies have to be absorbed, or the surface layer acts as a functional layer.

EXAMPLES

Example 1

For the production of an internally ventilated brake disc, the CFC bodies of the supporting zone and friction zone were first of all fabricated separately. For this purpose, compressible mixtures of short carbon fiber bundles, resins and pitches coated with carbon were produced in each case and added to compression molds. The mixtures were hardened in a press at temperatures of 100° to 180° C. and converted into porous CFK parts. These parts were then pyrolyzed at temperatures of 700° to 1000° C. and converted into CFC parts.

In the next step, the two CFC parts were joined together with an adhesive mixture that subsequently formed the barrier layer.

The solids content of the mixture of the adhesive layer consisted of mass fractions of 40% short carbon fibers with a length distribution of 0.01 to 0.5 mm, 40% liquid phenolic resin and 20% zirconium diboride powder ($ZrB_2$). The adhesive mixture was applied to the supporting zone body and the friction zone body was then pressed thereon. Following this the adhesive mixture was hardened at 120° C. to 180° C., the thickness of the hardened mixture being approximately 500 to 800 $\mu$m.

The siliconization of the structural part formed from the two CFC parts joined together then took place. For this the structural part was conventionally placed on CFC wicks in Si granules and coated with Si granules. The silicon was then melted in a vacuum furnace at temperatures of 1600° to 1900° C. and the molten silicon infiltrated the porous CFC structural part, whereupon a reaction occurred at least partially with the carbon in the matrix and on the fibers to form SiC.

The boron content in the connecting layer between the two prefabricated parts (supporting zone and friction zone) was approximately 5 wt. % after the siliconization.

Example 1a

Example 1 was repeated, the composition of the mixture corresponding to the barrier layer consisting of one third $TiB_2$ and two thirds phenolic resin; the mixture contained no carbon fibers.

Example 2

As a modification of Example 1 an adhesive mixture of mass proportions of 20% short carbon fibers, 50% $B_4C$ and 30% phenolic resin was used.

Example 3

For the production of a brake disc, in contrast to Examples 1 and 2, the CFC bodies were not bonded but were compressed in one stage. For this three compressible mixtures of different compositions were prepared and added successively to a compression mold. The first mixture (corresponding to the subsequent friction zone) consisted of coated short fiber bundles of shorter fiber length than for the supporting zone mixture, phenolic resin and pitch. The second mixture (corresponding to the subsequent barrier layer) was applied as a coating over the first mixture and consisted of 60% of titanium diboride ($TiB_2$) and 40% of phenolic resin. The mixture of coated short fiber bundles, phenolic resin and pitch corresponding to the supporting zone was applied as a coat over the second mixture. This was then followed in turn by the mixtures corresponding to the barrier layer and the friction zone. The whole composition was compressed and hardened in a press at 120° to 180° C.

The siliconization of the CFC structural part was carried out as in the first example at 1600° to 1900° C. in a vacuum furnace.

A second composite with the same dimensions was fabricated according to this example, in which however the barrier layer mixture did not contain titanium boride but simply phenolic resin and short carbon fibers.

Test specimens of the finished brake discs were exposed in a furnace at 800° C. to an air stream of 100 l/hour for 5 hours. After cooling, both discs were sliced radially and the zone in the vicinity of the axis was photographed. It can clearly be seen in the images of FIGS. 1 and 2 that no oxidative damage to the supporting zone has occurred in the case of the boron-containing barrier layer (FIG. 2), whereas a layer without such a glass-forming additive (FIG. 1) did not exhibit any protective effect. In FIG. 1, it can be seen that cavities have formed in the region of the supporting zone 1 facing the barrier layer 2', as they have in both cases in the surface layer.

We claim:

1. A multilayer ceramic composite, comprising:
   at least one composite material forming a supporting zone and containing oxidation-sensitive reinforcing fibers, said composite material includes a matrix containing at least one of a mass proportion of at least 25% SiC, further phases selected from the group consisting of phases having Si and phases having Si alloys, and carbon selected from the group consisting of carbon in elemental form and a carbon compound;
   at least one ceramic surface layer having reinforcing fibers, said ceramic surface layer including a matrix containing at least one of a mass proportion of at least 25% SiC, further phases selected from the group consisting of phases having Si and phases having Si alloys, and carbon selected from the group consisting of carbon in elemental form and a carbon compound; and
   at least one protective layer having a matrix composed substantially of at least one component of the matrix of one of said supporting zone and said ceramic surface layer, said protective layer disposed between said supporting zone and said ceramic surface layer and containing additives whose oxides are low melting point glasses having a melting point of at most 1250° C.

2. The multilayer ceramic composite according to claim 1, wherein compositions of said composite material of said ceramic surface layer and of said supporting zone are different.

3. The multilayer ceramic composite according to claim 1, wherein said reinforcing fibers are formed of at least one material selected from the group consisting of carbon fibers, graphite fibers and carbon-containing fibers.

4. The multilayer ceramic composite according to claim 1, wherein said additives of said protective layer are selected from the group consisting of high melting point elements, binary compounds and multinary compounds that have a melting point of at least 1450° C.

5. The multilayer ceramic composite according to claim 4, wherein said additives are selected from the group consisting of boron and non-oxidic boron compounds.

6. The multilayer ceramic composite according to claim 5, wherein said additives are selected from the group consisting of boron, boron carbide, calcium boride, boron silicide, aluminium boride, titanium boride and zirconium boride.

7. The multilayer ceramic composite according to claim 1, wherein said additives are selected from the group consisting of alkali metals, alkaline earth metals, aluminum compounds, and oxides of the aluminum compounds.

8. The multilayer ceramic composite according to claim 1, wherein said protection layer has reinforcing fibers, and a volume proportion of said reinforcing fibers in said protective layer is below 80%.

9. The multilayer ceramic composite according to claim 1, where said protective layer has a thickness of 0.02 to 5 mm.

10. The multilayer ceramic composite according to claim 1, wherein said support zone has a given thickness, and said ceramic surface layer has a thickness that is less than 50% of said given thickness of said supporting zone.

11. The multilayer ceramic composite according to claim 1, wherein the multilayer ceramic composite has a shape of a cylindrical disc with a given thickness, said ceramic surface layer having a thickness less than 20% of said given thickness of said cylindrical disc, and said thickness of said ceramic surface layer is at least 0.2 mm.

12. The multilayer ceramic composite according to claim 1, further comprising:
  a further protective layer disposed on said supporting zone; and
  a further surface layer disposed on said further protective layer.

13. A process for producing multilayer ceramic composites, which comprises the steps of:
  providing a carbon-containing fiber-reinforced precursor for forming a supporting zone;
  providing at least one carbon-containing precursor for forming a surface layer;
  bonding the carbon-containing fiber-reinforced precursor forming the supporting zone to the carbon-containing precursor forming the surface layer surface wide using an adhesive composition resulting in a bonded body, the adhesive composition during pyrolysis, produces a porous, carbon-containing layer and the adhesive composition containing glass-forming additives selected from the group consisting of admixtures of high melting point elements, binary compounds, and multinary compounds in each case having melting points of at least 1450° C., and due to oxidation the glass-forming additives produce low melting point glasses with a melting point of at most 1250° C.; and
  pyrolyzing the bonded body for forming a carbon-containing multilayer composite infiltrated with one of silicon and silicon alloys, and at least part of the carbon reacting with the silicon to form silicon carbide.

14. The process according to claim 13, which comprises providing the carbon-containing fiber-reinforced precursor with reinforcing fibers formed from at least one material selected from the group consisting of carbon fibers, graphite fibers, and carbon-containing fibers.

15. The process according to claim 13, which comprises setting a mean particle size of the glass-forming additives to be less than 120 µm.

16. The process according to claim 13, which comprises forming the glass-forming additives from at least one material selected from the group consisting of boron, boron carbide, calcium boride, boron silicide, aluminium boride, titanium boride and zirconium boride.

17. The process according to claim 13, which comprises bringing a silicon-containing melt into contact with the bonded body exclusively over a surface layer.

18. The process according to claim 13, after an infiltration and reaction with the silicon, heating the bonded body in one of air and an oxygen-containing gas mixture for a sufficient time at an appropriate temperature, whereupon the glass-forming additive is at least partially converted into a low melting point oxidic glass.

19. The process according to claim 18, which comprises carrying out the heating at an appropriate temperature until a mass fraction of oxide phases in the adhesive composition transformed into a protective layer is 1 to 80%.

20. A process for producing multilayer ceramic composites, which comprises the steps of:
  filling a compression mold with at least three molding compositions of different compositions that constitute precursors of a supporting zone, a protective layer and a surface layer, the molding compositions for the supporting zone and the surface layer contain carbon fibers and the molding composition leading to a formation of the protective layer contains a glass-forming additive selected from the group consisting of admixtures of high melting point elements, binary compounds, and multinary compounds each with melting points of at least 1450° C. and, due to oxidation, the glass-forming additive produces low melting point glasses with a melting point of at most 1250° C.;
  compressing the three molding compositions in the compression mold resulting in a compressed body; and
  pyrolyzing the compressed body resulting in a carbon-containing multilayer composite infiltrated with one of silicon and silicon alloys, and at least part of the carbon reacting with the silicon to form silicon carbide.

21. The process according to claim 20, which comprises providing a precursor of the supporting zone with reinforcing fibers formed of at least one material selected from the group consisting of carbon fibers, graphite fibers and carbon-containing fibers.

22. The process according to claim 20, which comprises setting a mean particle size of the glass-forming additives to be less than 120 µm.

23. The process according to claim 20, which comprises forming the glass-forming additives from at least one material selected from the group consisting of boron, boron carbide, calcium boride, boron silicide, aluminium boride, titanium boride and zirconium boride.

24. The process according to claim 20, which comprises bringing a silicon-containing melt into contact with the compressed body exclusively over a surface layer.

25. The process according to claim 20, after an infiltration and reaction with the silicon, heating the compressed body in one of air and an oxygen-containing gas mixture for a sufficient time at an appropriate temperature, whereupon the glass-forming additive is at least partially converted into a low melting point oxidic glass.

26. The process according to claim 25, which comprises carrying out the heating at an appropriate temperature until a mass fraction of oxide phases in the protective layer is 1 to 80%.

27. A method of using a multilayer ceramic composite, which comprises the steps of:
providing the multilayer ceramic composite according to claim 2; and
using the multilayer ceramic composite for forming one of brake discs, clutch discs, and brake linings.

* * * * *